United States Patent
Watanabe et al.

(10) Patent No.: US 6,984,182 B2
(45) Date of Patent: Jan. 10, 2006

(54) GOLF BALL

(75) Inventors: Hideo Watanabe, Chichibu (JP); Rinya Takesue, Chichibu (JP); Hiroyuki Nagasawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 16 days.

(21) Appl. No.: 10/913,421

(22) Filed: Aug. 9, 2004

(65) Prior Publication Data

US 2005/0032588 A1 Feb. 10, 2005

(30) Foreign Application Priority Data

Aug. 7, 2003 (JP) .............................. 2003-288434

(51) Int. Cl.
*A63B 37/12* (2006.01)
(52) U.S. Cl. ...................................................... 473/378
(58) Field of Classification Search ................ 473/378, 473/373, 374
See application file for complete search history.

(56) References Cited

U.S. PATENT DOCUMENTS 5,948,864 A 9/1999 Rajagopalan
6,562,912 B1 * 5/2003 Sullivan et al. .......... 525/330.2

FOREIGN PATENT DOCUMENTS

| JP | 2002-102389 | * | 4/2000 |
| JP | 2002-502678 A | | 1/2002 |
| JP | 2002-102389 A | | 4/2002 |
| WO | WO 99/40977 A1 | | 8/1999 |

* cited by examiner

*Primary Examiner*—Raeann Gorden
(74) *Attorney, Agent, or Firm*—Sughrue Mion, PLLC

(57) ABSTRACT

In a golf ball comprising a core and a cover of at least two layers, a cover outermost layer is formed of a composition comprising 100 pbw of a thermoplastic resin and 0.2–5 pbw of a cholesteric liquid crystal polymer, and a cover inner layer is formed of a composition comprising 100 pbw of a thermoplastic resin, 0.1–1 pbw of titanium oxide, and 0.05–1 pbw of a fluorescent pigment. The golf ball has an outer appearance whose color continuously changes with the viewing angle, a brilliance, a good color harmony over the entire ball, improved spin performance, and scuff resistance.

6 Claims, No Drawings

GOLF BALL

TECHNICAL FIELD

This invention relates to a three or multi-piece golf ball comprising a core and a cover of at least two layers enclosing the core. More particularly, it relates to a golf ball which has an outer appearance whose color changes with the viewing angle, a striking brilliance, a good color harmony over the entire ball, improved spin performance, and scuff resistance.

BACKGROUND ART

Most golf balls are colored white while a variety of golf balls of different colors are commercially available as well. Such balls, generally referred to as color balls, are colored red, blue, yellow, orange, green or otherwise by incorporating white pigments and fluorescent pigments in a resin composition of which the ball surface is made. It would be desirable to further improve the fashionable quality of balls. Recent known means of imparting a brilliance to the ball and endowing the ball with an outer appearance whose color changes with the viewing angle include a technique of incorporating a cholesteric liquid crystal polymer (of a cholesteric phase structure having nematic phases spirally stacked) into a cover resin composition.

For example, JP-A 2002-102389 discloses a golf ball comprising a core and a cover wherein the cover is formed of a composition comprising 100 parts by weight of a base resin and 0.1 to 20 parts by weight of a cholesteric liquid crystal. The ball has a brilliance and an outer appearance whose color changes with the viewing point.

However, in the case of three or multi-piece golf balls having an intermediate layer or layers between the solid core and the cover, when the above-described cover composition is used as a cover stock, the outer appearance of the resulting ball is largely affected by the color of the intermediate layer. Even if a brilliance is established by the cholesteric liquid crystal polymer, the color harmony over the entire ball can be exacerbated. Particularly when mold marks are noticeable on the ball surface after injection molding of the cover resin composition, the ball has a poor outer appearance. That is, the ball has noticeable mold marks on its surface despite a brilliance provided by the cholesteric liquid crystal polymer. It is desired to further improve the outer appearance of balls.

Depending on a formulation balance between cholesteric liquid crystal polymer and various pigments such as titanium oxide and fluorescent pigments and a particular composition of base resin, some of the characteristics essentially required for golf balls including ball rebound, controllability, feel on impact, durability and scuff resistance become poor. In particular, the golf ball of the above patent is low in spin performance and scuff resistance.

Reference is also made to JP-A 2002-502678 (WO 99/40977).

SUMMARY OF THE INVENTION

An object of the invention is to provide a golf ball which has an outer appearance whose color changes with the viewing angle, an improved brilliance, a good color harmony over the entire ball, improved spin performance, and scuff resistance.

The present invention addresses a golf ball comprising a solid core and a cover enclosing the core, wherein the cover includes at least two layers, an outermost layer and an inner layer disposed contiguous thereto. It has been found that by adding 0.2 to 5 parts by weight of a cholesteric liquid crystal polymer to 100 parts by weight of a base resin of which the cover outermost layer is formed and by adding up to 1 part by weight of titanium oxide and up to 1 part by weight of a fluorescent pigment to 100 parts by weight of a base resin of which the cover inner layer is formed, a good color balance is established between the cover outermost layer and the cover inner layer. The ball is endowed with an outer appearance whose color sharply changes with the viewing angle and has a striking brilliance or glitter. At the same time, various physical properties required for the golf ball including spin performance and scuff resistance are met.

The present invention provides a golf ball comprising a solid core and a cover enclosing the core, wherein the cover includes at least two layers, an outermost layer and an inner layer disposed contiguous thereto. The cover outermost layer is formed of a thermoplastic resin base composition comprising 100 parts by weight of a thermoplastic resin and 0.2 to 5 parts by weight of a cholesteric liquid crystal polymer. The cover inner layer is formed of a thermoplastic resin base composition comprising 100 parts by weight of a thermoplastic resin, up to 1 part by weight of titanium oxide, and up to 1 part by weight of a fluorescent pigment.

In a preferred embodiment, the composition of which the cover outermost layer is formed further comprises up to 0.4 part by weight of titanium oxide per 100 parts by weight of the thermoplastic resin. In another preferred embodiment, the composition of which the cover outermost layer is formed further comprises 0.01 to 0.5 part by weight of carbon black per 100 parts by weight of the cholesteric liquid crystal polymer.

In a preferred embodiment, the solid core undergoes a compressive deflection amount of 2.5 to 5.0 mm when the load applied thereto is increased from an initial load of 10 kgf (98.07 N) to a final load of 130 kgf (1274.91 N); the cover outermost layer has a Shore D hardness of 50 to 62; the cover inner layer has a Shore D hardness of 45 to 55; and the golf ball as a whole undergoes a compressive deflection amount of 2.0 to 4.0 mm when the load applied thereto is increased from an initial load of 10 kgf (98.07 N) to a final load of 130 kgf (1274.91 N).

The golf ball of the invention has an outer appearance whose color continuously changes with the viewing angle, a striking brilliance or glitter, and a good color harmony over the entire ball. It is also improved in spin performance and scuff resistance.

DESCRIPTION OF THE PREFERRED EMBODIMENTS

The invention pertains to a golf ball of three or more layer structure comprising a solid core and a cover of at least two layers enclosing the core, that is, a multi-piece golf ball.

The solid core may be formed of a well-known rubber composition. The base rubber may be polybutadiene. It is recommended to use as the base rubber a cis-1,4-polybutadiene having at least 40% of cis-configuration. Natural rubber, polyisoprene rubber, styrene-butadiene rubber or the like may be additionally compounded in the base rubber.

In the rubber composition, there may be compounded crosslinking agents. Examples include zinc and magnesium salts of unsaturated fatty acids such as zinc methacrylate and zinc acrylate, and ester compounds such as trimethylolpropane trimethacrylate. Of these, zinc acrylate is most preferred for imparting high resilience. The crosslinking agent is typically compounded in an amount of at least 10 parts, preferably at least 15 parts by weight, but up to 50 parts, preferably up to 40 parts by weight per 100 parts by weight of the base rubber.

In the rubber composition, there may be compounded organic peroxides. Examples include 1,1-bis-t-butylperoxy-3,3,5-trimethylcyclohexane, dicumyl peroxide, di(t-butylperoxy)-m-diisopropylbenzene, and 2,5-dimethyl-2,5-di-t-butylperoxyhexane. These peroxides are commercially available under the trade name of Percumyl (by NOF Corp.) and Trigonox 29-40 (by Kayaku Akuzo Corp.). The organic peroxide is typically compounded in an amount of at least 0.1 part, preferably at least 0.5 part by weight, but up to 5 parts, preferably up to 2 parts by weight per 100 parts by weight of the base rubber.

Various additives may be further compounded in the rubber composition. Suitable additives include sulfur, antioxidants, zinc oxide, barium sulfate, the zinc salt of pentachlorothiophenol, zinc stearate and the like. The amounts of these additives compounded are not particularly limited.

The solid core should preferably have a deflection hardness, that is, a compressive deflection or deformation amount incurred when the load applied thereto is increased from an initial load of 98 N (10 kgf) to a final load of 1275 N (130 kgf), of 2.5 to 5.0 mm, more preferably 3.0 to 4.5 mm, and even more preferably 3.5 to 4.0 mm. Too low a deflection hardness may lead to a hard feel when hit with a driver and degraded scuff resistance. Too high a deflection hardness may lead to a very soft feel when hit with a driver and a substantially reduced carry.

Any well-known method may be used to prepare the solid core. For example, the solid core can be prepared by kneading various components on a conventional mixer such as a Banbury mixer, kneader or roll mill to form a rubber compound, and compression molding the rubber compound in a core mold.

According to the invention, the solid core is enclosed with a cover which includes at least two layers, that is, at least an outermost layer and an inner layer disposed contiguous thereto.

The cover outermost layer is formed of a resin composition based on a thermoplastic resin. Suitable thermoplastic resins include ionomer resins and thermoplastic elastomers. The ionomer resins are commercially available under the trade name of Himilan (Dupont-Mitsui Polychemicals Co., Ltd.), Surlyn (Dupont), and Iotek (Exxon). The thermoplastic elastomers include polyester, polyamide, polyurethane, olefin, and styrene base thermoplastic elastomers. They are commercially available under the trade name of Hytrel (Dupont-Toray Co., Ltd.), Pelprene (Toyobo Co., Ltd.), Pebax (Toray Co., Ltd.), Pandex (Dainippon Ink & Chemicals, Inc.), Santoprene (Monsanto Chemical Co.), Tuftec (Asahi Kasei Chemicals Corp.), and Dynaron (JSR Corp.).

In the base resin for the cover outermost layer, a cholesteric liquid crystal polymer is incorporated for imparting to the ball an outer appearance whose color changes with the viewing angle and a brilliance. The cholesteric liquid crystal polymer is a side chain liquid crystalline polymer possessing mesogen groups on side chains and having a function of reflecting only a certain wavelength region of incident light having a wide spectrum and transmitting all wavelengths outside that region due to its optical interference effect. Owing to this function, the outer appearance of the ball is endowed with the feature that the color continuously changes with the viewing direction. For the cholesteric liquid crystal polymer, commercial products may be used. For example, Helicone HC (Wacker Chemie GmbH) is advantageously employed.

In the cover outermost layer-forming composition, the cholesteric liquid crystal polymer is compounded in an amount of 0.2 to 5 parts by weight per 100 parts by weight of the base resin. The preferred lower limit is 0.5 part by weight, and the preferred upper limit is 2 parts by weight. Outside the range, less amounts of the cholesteric liquid crystal polymer fail to fully exert the effect of improving the ball outer appearance, whereas more amounts cause the ball as molded to show more noticeable mold marks on its surface, adversely affecting the ball outer appearance.

Carbon black may be added to the cholesteric liquid crystal polymer. The amount of carbon black, if added, is 0.01 to 0.5 parts by weight per 100 parts by weight of the cholesteric liquid crystal polymer. The preferred lower limit is 0.05 part by weight, especially 0.08 part by weight, and the preferred upper limit is 0.2 part by weight, especially 0.15 part by weight. By virtue of the synergistic effect of cholesteric liquid crystal polymer and carbon black, the compounding of carbon black is effective for enhancing the color change dependent on the viewing angle and the brilliance and making the color of the ball outer appearance more distinctive.

In the cover outermost layer-forming composition, titanium oxide may be added in an amount of up to 0.4 parts by weight per 100 parts by weight of the base resin. More amounts of titanium oxide may adversely affect the brilliance and fail to provide a color synergy with the cover inner layer contiguous to the outermost layer.

It is recommended that the cover outermost layer have a Shore D hardness of at least 50, preferably at least 53, but up to 62, preferably up to 60. Too high a hardness may adversely affect controllability because it may become difficult to obtain an adequate spin rate on approach shots. Too low a hardness may result in a ball with poor rebound and hence, a short carry.

The cover outermost layer should desirably be formed to a thickness of at least 0.7 mm, more preferably at least 1.2 mm, but up to 2.2 mm, more preferably up to 1.6 mm. Too thin a cover outermost layer may provide unsatisfactory spin performance or lose durability to cracking by repeated impact. Too thick a cover outermost layer may provide an unsatisfactory color synergy with the cover inner layer and result in a ball with a poor color harmony and less rebound and hence, a short carry.

Next, the cover inner layer which is disposed contiguous to the cover outermost layer is described.

The cover inner layer is also formed of a resin composition based on a thermoplastic resin. The thermoplastic resin used herein may be selected from those resins illustrated for the cover outermost layer. If the base of the cover inner layer is a rubber composition, the ball probably has a less brilliant outer appearance.

In the cover inner layer-forming composition, titanium oxide and a fluorescent pigment are added to the base resin. Titanium oxide is compounded in an amount of up to 1 part, preferably up to 0.5 part, more preferably up to 0.4 part, even more preferably up to 0.2 part by weight per 100 parts by weight of the base resin. The preferred lower limit is 0.1 part by weight. Too much amounts of titanium oxide prevent the ball outer appearance from reflecting the color of the fluorescent pigment. On the other hand, the fluorescent pigment is compounded in an amount of up to 1 part, preferably up to 0.5 part, more preferably up to 0.2 part by weight per 100 parts by weight of the base resin. The preferred lower limit is 0.05 part by weight. Too much amounts of the fluorescent pigment make the cover inner layer darker color and thus degrade a color harmony with the cover outermost layer, failing to improve the aesthetic appearance of the ball. A commercial example of the fluorescent pigment which is added to the base resin of the cover inner layer-forming composition is a fluorescent pigment mixture DermaGlo (Day-Glo Color Corp.). By using this fluorescent pigment mixture in an amount within the above-specified range, the cover inner layer can be colored white, yellow, pink, yellowish green or light blue as desired. Since the color developed as the background is relatively pale, advantageously the gate marks and weld lines left after injection molding of the cover outermost layer become almost invisible. If the color is relatively dark, there is a possibility that the ball look smaller when the golfer actually plays, which is unpleasant to the golfer.

It is recommended that the cover inner layer have a Shore D hardness of at least 45, preferably at least 48, but up to 55, preferably up to 53. Too low a hardness may result in a ball with less rebound and hence, a short carry. Too high a hardness may lead to a poor feel on impact and low scuff resistance.

The cover inner layer should desirably be formed to a thickness of at least 0.8 mm, more preferably at least 1.2 mm, but up to 2.2 mm, more preferably up to 1.8 mm. Too thin a cover inner layer may lose durability to cracking by repeated impact. Too thick a cover inner layer may result in a ball with less rebound and hence, a short carry.

In both the cover compositions, various other additives such as UV absorbers, antioxidants, metal soaps, pigments other than the fluorescent ones, and inorganic fillers may be added to the base resins in appropriate amounts.

When the solid core is enclosed with the cover to manufacture the golf ball, any of well-known methods such as injection molding and compression molding may be employed. In the case of injection molding, for example, the preformed solid core is set within a mold, and the cover stock is injected into the mold in a conventional manner.

It is understood that the golf ball of the invention has the cover which consists of two or more layers. In addition to the above-described cover outermost layer and inner layer, the cover may include one or more intermediate layers between the cover inner layer and the solid core. Such an intermediate layer is formed of a resin composition based on a resin which is preferably selected from those resins illustrated above for the cover inner layer.

The multi-piece solid golf ball thus constructed should preferably have a deflection hardness, that is, a compressive deflection or deformation amount incurred when the load applied thereto is increased from an initial load of 98 N (10 kgf) to a final load of 1275 N (130 kgf), of at least 2.0 mm, more preferably at least 2.3 mm, and most preferably at least 2.5 mm, but up to 4.0 mm, more preferably up to 3.5 mm, and most preferably up to 3.2 mm. Too low a deflection hardness of the ball may lead to an unfavorable feel when hit and an increased spin rate on iron shots and hence, a drastically reduced carry. Too high a deflection hardness may result in a ball which has less rebound and travels a shorter distance when hit with a driver.

The golf ball of the invention has a diameter and weight which conform with the Rules of Golf (USGA). That is, the ball has a diameter of not less than 42.67 mm and a weight of not greater than 45.93 g.

EXAMPLE

Examples of the invention and comparative examples are given below by way of illustration and not by way of limitation.

Examples 1–4 & Comparative Examples 1–4

Solid cores were formed by using rubber compositions of the formulation shown in Table 1 and molding and vulcanizing at 157° C. for 15 minutes.

Components were milled according to the formulation shown in Table 2 on a kneader type twin-screw extruder at 200° C., obtaining a cover inner layer-forming composition in pellet form. This composition was injected into a mold in which the solid core had been held in place, obtaining a sphere in which the solid core was enclosed with the cover inner layer.

Next, components were milled according to the formulation shown in Table 2 on a kneader type twin-screw extruder at 200° C., obtaining a cover outermost layer-forming composition in pellet form. This composition was injected into a mold in which the sphere had been held in place, obtaining a three-piece solid golf ball.

The golf balls thus manufactured were tested, with the results shown in Table 3. The outer appearance and properties of the ball were evaluated as follows.

Hardness of Solid Core and Ball

A compressive deflection amount (mm) was measured that the solid core or ball underwent when the load applied thereto was increased from an initial load of 10 kgf (98.07 N) to a final load of 130 kgf (1274.91 N).

Ball Outer Appearance

Ten amateur golfers with a handicap rating within 10 visually observed the surface of a ball to inspect for (1) mold marks formed along resin flow paths, (2) brilliance, (3) color change with the viewing angle, and (4) overall color balance.

OK: 8 or more golfers judged excellent
mediocre: 4 to 6 golfers judged excellent
NG: 3 or less golfers judged excellent Ball Initial Velocity
measured according to the method of USGA.

Scuff Resistance

A swing robot was equipped with a pitching wedge having an unplated face. The ball was hit once at a head speed of 40 m/s. The scuff marks on the ball surface were visually observed and rated as follows.

OK: least fluffy scuff marks, negligible on use
NG: fluffy scuff marks, damaged to a level unacceptable on use

TABLE 1

| Components | Example | | | | Comparative Example | | | |
|---|---|---|---|---|---|---|---|---|
| (pbw) | 1 | 2 | 3 | 4 | 1 | 2 | 3 | 4 |
| Cis-1,4-polybutadiene | 100 | 100 | 100 | 100 | 100 | 100 | 100 | 100 |
| Zinc acrylate | 28.45 | 28.45 | 28.45 | 28.45 | 28.45 | 28.45 | 28.45 | 28.45 |
| Peroxide 1 | 0.6 | 0.6 | 0.6 | 0.6 | 0.6 | 0.6 | 0.6 | 0.6 |
| Peroxide 2 | 0.6 | 0.6 | 0.6 | 0.6 | 0.6 | 0.6 | 0.6 | 0.6 |

TABLE 1-continued

| Components (pbw) | Example 1 | Example 2 | Example 3 | Example 4 | Comparative Example 1 | Comparative Example 2 | Comparative Example 3 | Comparative Example 4 |
|---|---|---|---|---|---|---|---|---|
| Antioxidant | 0.1 | 0.1 | 0.1 | 0.1 | 0.1 | 0.1 | 0.1 | 0.1 |
| Zinc oxide | 31.3 | 31.3 | 31.3 | 31.3 | 31.3 | 31.3 | 31.3 | 31.3 |
| Zinc salt of pentachlorothiophenol | 1 | 1 | 1 | 1 | 1 | 1 | 1 | 1 |
| Zinc stearate | 5 | 5 | 5 | 5 | 5 | 5 | 5 | 5 |

Note:
Peroxide 1: dicumyl peroxide, trade name Percumyl D by NOF Corp.
Peroxide 2: 1,1-bis(t-butylperoxy)-3,3,5-trimethylcyclohexane, trade name Perhexa 3M-40 by NOF Corp.
Antioxidant: Nocrac NS-6 by Ouchi Shinko Chemical Industry Co., Ltd.

TABLE 2

| Components (pbw) | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Cover outermost layer | Himilan 1557 | 50 | | 50 | | | | | |
| | Himilan 1601 | 50 | | 50 | | | | | |
| | Surlyn 7930 | | 60 | | 60 | 60 | 60 | 60 | 60 |
| | Surlyn AD8542 | | 35 | | 35 | 35 | 35 | 35 | 35 |
| | Nucrel AN4318 | | 5 | | 5 | 5 | 5 | 5 | 5 |
| | Fluorescent pigment (orange) | | | | | | | | 2 |
| | Helicone HC Jade | 1.25 | 1.25 | 0.5 | 4 | | 10 | 1.25 | |
| | Carbon black | 0.02 | 0.02 | 0.02 | 0.02 | | | 0.02 | |
| | Titanium white (TiO$_2$) | | | | | 2 | | | |
| Cover inner layer | Surlyn 7930 | 22.5 | 22.5 | 22.5 | 22.5 | 22.5 | 22.5 | 22.5 | 22.5 |
| | Himilan AM7311 | 22.5 | 22.5 | 22.5 | 22.5 | 22.5 | 22.5 | 22.5 | 22.5 |
| | Nucrel AN4318 | 25 | 25 | 25 | 25 | 25 | 25 | 25 | 25 |
| | Dynaron E6100P | 30 | 30 | 30 | 30 | 30 | 30 | 30 | 30 |
| | Fluorescent pigment (yellow) | 0.2 | 0.2 | 0.2 | 0.2 | | | | |
| | Fluorescent pigment (orange) | | | | | | | 2 | |
| | Titanium white (TiO$_2$) | 0.1 | 0.1 | 0.1 | 0.1 | 2 | 2 | | 2 |
| | Magnesium stearate | 0.35 | 0.35 | 0.35 | 0.35 | 0.35 | 0.35 | 0.8 | 0.35 |

Note:
Himilan 1557, 1601, AM7311: ionomer resins by Dupont-Mitsui Polychemicals Co., Ltd.
Surlyn 7930, AD8542: ionomer resins by E.I. DuPont de Nemours and Company
Nucrel AN4318: ethylene-methacrylic acid-acrylic ester ternary copolymer by Dupont-Mitsui Polychemicals Co., Ltd.
Dynaron 6100P: block copolymer having crystalline olefin blocks by JSR Corp.
Fluorescent pigment (orange): fluorescent mix DermaGlo DG-R428, blaze orange, by Day-Glo Corp.
Fluorescent pigment (yellow): fluorescent mix DermaGlo DG-Y311, Saturn yellow, by Day-Glo Corp.
Helicone HC Jade: cholesteric liquid crystal polymer by Wacker Chemie GmbH

TABLE 3

| Components (pbw) | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Solid core | Outer diameter (mm) | 36.4 | 36.4 | 36.4 | 36.4 | 36.4 | 36.4 | 36.4 | 36.4 |
| | Hardness (mm) | 3.5 | 3.5 | 3.5 | 3.5 | 3.5 | 3.5 | 3.5 | 3.5 |
| Cover outermost layer | Thickness (mm) | 1.5 | 1.5 | 1.5 | 1.5 | 1.5 | 1.5 | 1.5 | 1.5 |
| | Shore D hardness | 60 | 57 | 60 | 57 | 57 | 57 | 57 | 57 |
| Cover inner layer | Color | pale yellow | pale yellow | pale yellow | pale yellow | white | white | orange | white |
| | Thickness (mm) | 1.65 | 1.65 | 1.65 | 1.65 | 1.65 | 1.65 | 1.65 | 1.65 |
| | Shore D hardness | 51 | 51 | 51 | 51 | 51 | 51 | 51 | 51 |
| Ball | Weight (g) | 45.4 | 45.4 | 45.4 | 45.4 | 45.4 | 45.4 | 45.4 | 45.4 |
| | Outer diameter (mm) | 42.7 | 42.7 | 42.7 | 42.7 | 42.7 | 42.7 | 42.7 | 42.7 |
| | Hardness (mm) | 2.7 | 2.8 | 2.7 | 2.8 | 2.8 | 2.8 | 2.8 | 2.8 |
| Outer appearance | mold marks | not visible | not visible | not visible | not visible | not visible | visible | visible | not visible |
| | brilliance | OK | OK | OK | OK | NG | OK | OK | NG |
| | color change with viewing angle | OK | OK | OK | OK | NG | OK | OK | NG |

TABLE 3-continued

| Components | Example | | | | Comparative Example | | | |
|---|---|---|---|---|---|---|---|---|
| (pbw) | 1 | 2 | 3 | 4 | 1 | 2 | 3 | 4 |
| overall color balance | OK | OK | OK | OK | OK | mediocre | mediocre | OK |
| Initial velocity | 77.1 | 76.8 | 77.1 | 76.8 | 76.8 | 76.7 | 76.8 | 76.8 |
| Scuff resistance | OK | OK | OK | OK | NG | OK | OK | NG |

As is evident from the above data, the golf balls of Examples 1 to 4, based on a combination of the cover outermost layer with the cover inner layer as shown in Table 2, have an excellent outer appearance and good scuff resistance. In contrast, the golf balls of Comparative Examples are unacceptable in at least one of the ball appearance tests. In particular, the golf balls of Comparative Examples 1 and 4 are less resistant to scuff.

Japanese Patent Application No. 2003-288434 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A golf ball comprising a solid core and a cover enclosing the core, wherein the cover includes at least two layers, an outermost layer and an inner layer disposed contiguous thereto,
   the cover outermost layer is formed of a thermoplastic resin base composition comprising 100 parts by weight of a thermoplastic resin and 0.2 to 5 parts by weight of a cholesteric liquid crystal polymer, and
   the cover inner layer is formed of a thermoplastic resin base composition comprising 100 parts by weight of a thermoplastic resin, up to 1 part by weight of titanium oxide, and up to 1 part by weight of a fluorescent pigment,
   wherein the composition of which the cover outermost layer is formed further comprises 0.01 to 0.5 part by weight of carbon black per 100 parts by weight of the cholesteric liquid crystal polymer, and
   wherein said solid core undergoes a compressive deflection amount of 2.5 to 5.0 mm when the load applied thereto is increased from an initial load of 10 kgf (98.07 N) to a final load of 130 kgf (1274.91 N),
   said cover outermost layer has a Shore D hardness of 50 to 62,
   said cover inner layer has a Shore D hardness of 45 to 55, and
   the golf ball as a whole undergoes a compressive deflection amount of 2.0 to 4.0 mm when the load applied thereto is increased from an initial load of 10 kgf (98.07 N) to a final load of 130 kgf (1274.91 N).

2. The golf ball of claim 1, wherein the composition of which the cover outermost layer is formed further comprises up to 0.4 part by weight of titanium oxide.

3. A golf ball comprising a solid core and a cover enclosing the core, wherein the cover includes at least two layers, an outermost layer and an inner layer disposed contiguous thereto,
   the cover outermost layer is formed of a thermoplastic resin base composition comprising 100 parts by weight of a thermoplastic resin and 0.2 to 5 parts by weight of a cholesteric liquid crystal polymer, and
   the cover inner layer is formed of a thermoplastic resin base composition comprising 100 parts by weight of a thermoplastic resin, up to 1 part by weight of titanium oxide, and up to 1 part by weight of a fluorescent pigment,
   wherein the composition of which the cover outermost layer is formed further comprises 0.01 to 0.5 part by weight of carbon black per 100 parts by weight of the cholesteric liquid crystal polymer.

4. The golf ball of claim 3, wherein the composition of which the cover outermost layer is formed further comprises up to 0.4 part by weight of titanium oxide.

5. A golf ball comprising a solid core and a cover enclosing the core, wherein the cover includes at least two layers, an outermost layer and an inner layer disposed contiguous thereto,
   the cover outermost layer is formed of a thermoplastic resin base composition comprising 100 parts by weight of a thermoplastic resin and 0.2 to 5 parts by weight of a cholesteric liquid crystal polymer, and
   the cover inner layer is formed of a thermoplastic resin base composition comprising 100 parts by weight of a thermoplastic resin, up to 1 part by weight of titanium oxide, and up to 1 part by weight of a fluorescent pigment,
   wherein said solid core undergoes a compressive deflection amount of 2.5 to 5.0 mm when the load applied thereto is increased from an initial load of 10 kgf (98.07 N) to a final load of 130 kgf (1274.91 N),
   said cover outermost layer has a Shore D hardness of 50 to 62,
   said cover inner layer has a Shore D hardness of 45 to 55, and
   the golf ball as a whole undergoes a compressive deflection amount of 2.0 to 4.0 mm when the load applied thereto is increased from an initial load of 10 kgf (98.07 N) to a final load of 130 kgf (1274.91 N).

6. The golf ball of claim 5, wherein the composition of which the cover outermost layer is formed further comprises up to 0.4 part by weight of titanium oxide.

* * * * *